US006612449B1

(12) United States Patent
Otani et al.

(10) Patent No.: US 6,612,449 B1
(45) Date of Patent: Sep. 2, 2003

(54) INTELLIGENT POWER ASSISTED MANUAL MANIPULATOR

(75) Inventors: Ernest M. Otani, White Lake, MI (US); Donald S. Bartlett, Troy, MI (US); Hadi A. Akeel, Rochester Hills, MI (US); H. Dean McGee, Rochester Hills, MI (US); Lupcho Najdovski, Sterling Heights, MI (US); James C. Hobson, West Bloomfield, MI (US); Stan H. McClosky, Rochester Hills, MI (US); Robert V. Bauer, Jr., Clarkston, MI (US); Robert Frease, Lake Orion, MI (US)

(73) Assignee: FANUC Robotics North America, Inc., Rochester Hills, MI (US)

( * ) Notice: Subject to any disclaimer, the term of this patent is extended or adjusted under 35 U.S.C. 154(b) by 0 days.

(21) Appl. No.: 09/458,295

(22) Filed: Dec. 10, 1999

(51) Int. Cl.[7] ............................................... B66C 11/10
(52) U.S. Cl. ....................................................... 212/317
(58) Field of Search ................................ 212/171, 317, 212/321, 315, 224, 318, 334

(56) References Cited

U.S. PATENT DOCUMENTS

| | | | | |
|---|---|---|---|---|
| 792,115 A | * | 6/1905 | Bogie | .......................... 212/321 |
| 1,931,700 A | | 10/1933 | Murphy et al. | |
| 2,718,311 A | | 9/1955 | Cain | |
| 3,262,593 A | * | 7/1966 | Haind | .......................... 212/317 |
| 3,540,603 A | | 11/1970 | Neumeier | |
| 4,668,155 A | | 5/1987 | Kaufmann et al. | |

(List continued on next page.)

FOREIGN PATENT DOCUMENTS

| | | | | |
|---|---|---|---|---|
| DE | 1456493 | * | 1/1970 | ................. 212/317 |
| FR | 710019 | * | 8/1931 | ................. 212/317 |

OTHER PUBLICATIONS

Japan Economic Journal—Science & Technology: p. 16; More Flexible Robot Arm Action Attained, Nov. 1984.*

(List continued on next page.)

*Primary Examiner*—Eileen D. Lillis
*Assistant Examiner*—Raymond B. Johnson
(74) *Attorney, Agent, or Firm*—Howard & Howard

(57) ABSTRACT

An intelligent power assisted manual manipulator controllable by operator inputs from an operator for moving an object is provided. The manipulator includes a movable base supporting a lift mechanism for moving the object. The manipulator also includes at least one servomotor for actuating at least one of the movable base and the lift mechanism for moving the object. An operator control mechanism for receiving the operator inputs is supported on the lift mechanism. A plurality of force sensors are disposed between the operator control mechanism and the lift mechanism for sensing said operator inputs and actuating at least one of the at least one servomotor. The movable base includes an overhead rail defining a generally horizontal first axis and a carriage supported on the overhead rail and movable along the first axis. The lift mechanism includes a turret assembly supported on the carriage having a generally vertical second axis, and a generally horizontal third axis. The carriage has first and second elongated portions in opposing generally horizontal planes and third and fourth elongated portions in generally vertical planes. Oversize rollers on unhardened ways support the carriage. A main arm extends from the turret with the main arm being rotatable about the second and third axes. An attachment interface is supported by the main arm and adapted to support the object, the attachment interface having a fifth axis about which the attachment interface is rotatable. The manipulator is also adapted for lifting different objects having different weights. The arm has a portion opposite the pivotal connection adapted to support the object. A gravity balancer mechanism is adapted to support the different weights, and a motion servomotor is adapted to produce a movement of the arm by drivingly rotating the arm about the axis.

15 Claims, 7 Drawing Sheets

U.S. PATENT DOCUMENTS

| | | | |
|---|---|---|---|
| 5,088,610 A | | 2/1992 | Garnier |
| 5,096,357 A | | 3/1992 | Galbani |
| 5,186,343 A | | 2/1993 | Bozzi |
| 5,350,075 A | * | 9/1994 | Kahlman .................... 212/315 |
| 5,456,130 A | | 10/1995 | Pierson et al. |
| 5,489,032 A | | 2/1996 | Mayhall, Jr. et al. |
| 5,520,502 A | | 5/1996 | Liljengren et al. |
| 5,865,426 A | | 2/1999 | Kazerooni |
| 5,915,673 A | | 6/1999 | Kazerooni |
| 6,204,619 B1 | | 3/2001 | Gu et al. |

OTHER PUBLICATIONS

Japan Industrial Journal; p. 17; Mechanical Engineering Lab Develops Robot LAN, Aug. 1991.*

IEEE Transactions on Robotic and Automation; vol. 13, No. 6; Toward the Implementation of Hybrid, Dec. 1997.*

A Base Force/Torque Sensor Approach to Robot Manipulator Inertial Parameter Estimation; Guangjun Liu et al: Proceeding of 1998 IEEE Internal Conference on Robotic & Automation; Leuvers, Belgium, May 1998.*

T.J. Tarn et al; A Versatile Experimental System for Dual–Arm Planning and Control; NSF Grant IRI 9106317 and Sandia National Laboratories Contract No. AC.37.52.C; IEEE Publisher, Jul. 1994.*

* cited by examiner

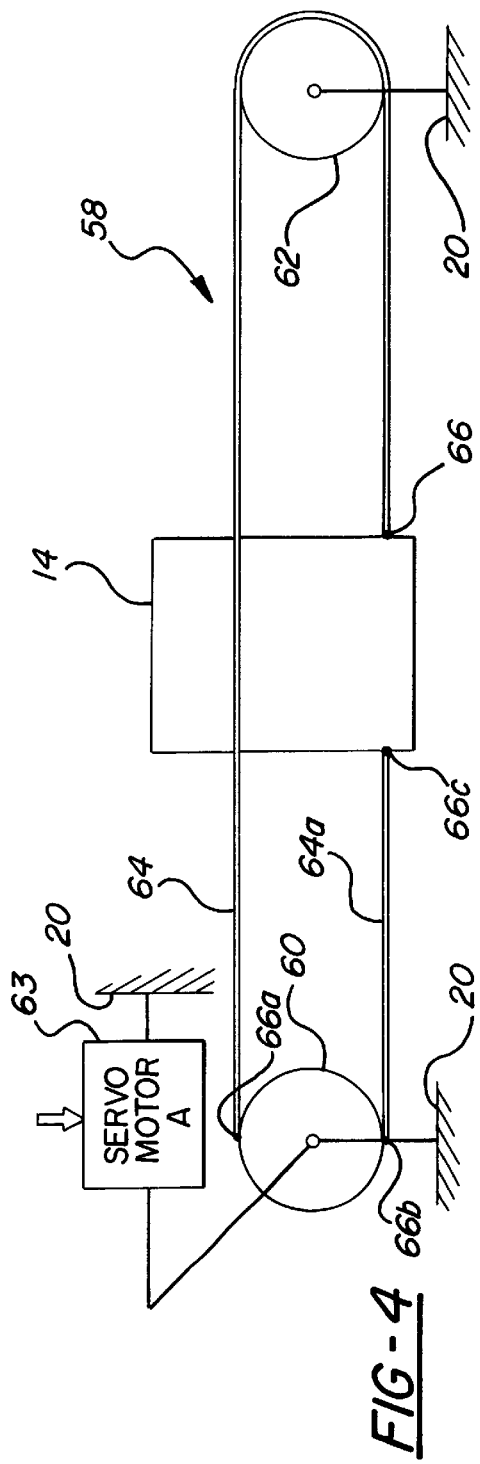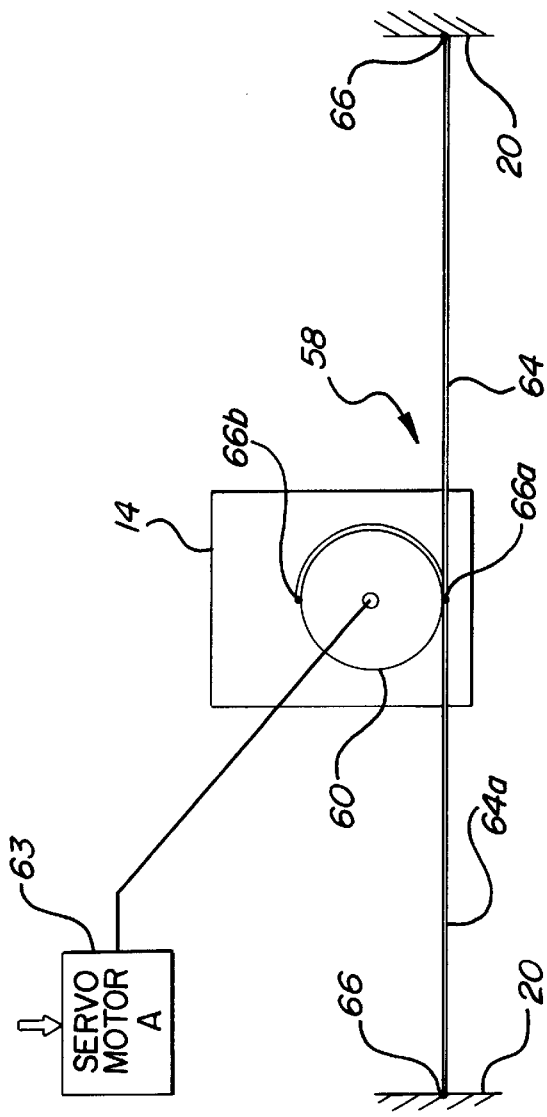

INTELLIGENT POWER ASSISTED MANUAL MANIPULATOR

RELATED APPLICATIONS

This application is related to assignee's copending U.S. patent application entitled "Method of Controlling and Using an Intelligent Assist Device" filed on the same date as the present application. Each application is directed to different inventions.

BACKGROUND OF TIE INVENTION

This invention relates to an intelligent power assisted manual manipulator controllable by operator inputs from an operator for moving an object.

Manipulators are used to reorient or move heavy objects from one location to another. One type of manipulator is a powered manipulator that utilizes overhead rails or a bridge gantry with a carriage movably supported thereon. An arm is pivotally attached to the carriage to lift the objects from overhead. It is desirable to have the operator as close to the object as possible to make movement of the object more intuitive as if the operator was actually lifting and moving the object. To this end, it is desirable to utilize power assisted manual manipulators. Operator safety is an important consideration when designing power assisted devices and determining appropriate power sources for moving the objects because the weight of the objects or power source may produce high forces capable of seriously injuring the operator. However, a power assisted manual manipulator must also provide adequate operator safety. As a result, the devices typically are either manipulated using either only physical force imparted on the device by an operator or by remote actuation of hydraulic or pneumatic cylinders to avoid operator injury. Relying on only the operator's physical strength limits the weight of the objects to be moved and creates ergonomic problems. Utilizing hydraulic or pneumatic power sources provides only rough control of the device's movements making remote actuation difficult and power assisted manual operation of the device unsafe. Also, lack of a direct, intuitive human interface requires a lengthy training period before an operator can safely and effectively operate the manipulator.

Manipulators utilizing carriages supported on overhead rails typically are designed to achieve precision alignment between the carriage and the rail. To this end, carriages having rollers supported on precision machined hardened ways have been used. However, achieving precision alignment in this manner is difficult and costly. Further, manipulators often utilize hydraulic or pneumatic loads, or weights to both move the object and to counterbalance the weight of heavy objects and the weight of the lift mechanism. These balancers are suited for counterbalancing the weight of one object and are not well suited to balancing objects of different weights or do not provide the necessary control of the object. Therefore, what is needed is an intelligent power assisted manual manipulator that is safe for an operator to use, cost effective, and that may accommodate objects of different weights while providing the needed control of the object.

SUMMARY OF THE INVENTION AND ADVANTAGES

The present invention provides an intelligent power assisted manual manipulator controllable by operator inputs from an operator for moving an object. The manipulator includes a movable base supporting a lift mechanism for moving the object. The manipulator also includes at least one servomotor for actuating the lift mechanism and moving the object. An operator control mechanism for receiving the operator inputs is supported on the lift mechanism. A plurality of force sensors are disposed between the operator control mechanism and the lift mechanism for sensing said operator inputs and actuating at least one of servomotors.

According to an another aspect of the present invention, the movable base includes an overhead rail defining a generally horizontal first axis and a carriage supported on the overhead rail and movable along the first axis. The lift mechanism includes a turret assembly supported on the carriage having a generally vertical second axis, and a generally horizontal third axis. A main arm extends from the turret and is rotatable about the third axis. Since the main arm is attached to the turret it is rotatable about the second axis with the turret. An attachment interface is supported by the main arm and adapted to support the object, the attachment interface having a fifth axis about which the attachment interface is rotatable.

According to yet another aspect of the present invention, the manipulator is also adapted for lifting different objects having different weights. The manipulator includes a support member and an arm extending from the support member at a pivotal connection. The pivotal connection defines a generally horizontal axis with the arm rotatable about the axis in a generally vertical plane. The arm has a portion opposite the pivotal connection adapted to support the object. A lift servomotor is adapted to support the different weights including the weight of the arm itself, and a motion servomotor is adapted to produce a movement of the arm by drivingly rotating the arm about the axis.

According to still another aspect of the present invention, the carriage has first and second elongated portions in opposing generally horizontal planes and third and fourth elongated portions in generally vertical planes. First, second, third, and fourth ways are disposed along the first, second, third, and fourth elongated portions, respectively, for providing a bearing surface. At least two first, second, third, and fourth rollers are supported on the carriage and are in rolling engagement with the first, second, third, and fourth ways, respectively.

Accordingly, the above aspects of the present invention provide an intelligent power assisted manual manipulator that is safe for an operator to use and that may accommodate objects of different weights.

BRIEF DESCRIPTION OF THE DRAWINGS

Other advantages of the present invention can be understood by reference to the following detailed description when considered in connection with the accompanying drawings wherein:

FIG. 4 is a cable drive assembly of the present invention;

FIG. 5 is an alternative embodiment of the cable drive assembly;

DETAILED DESCRIPTION OF THE PREFERRED EMBODIMENT

Figure 1:
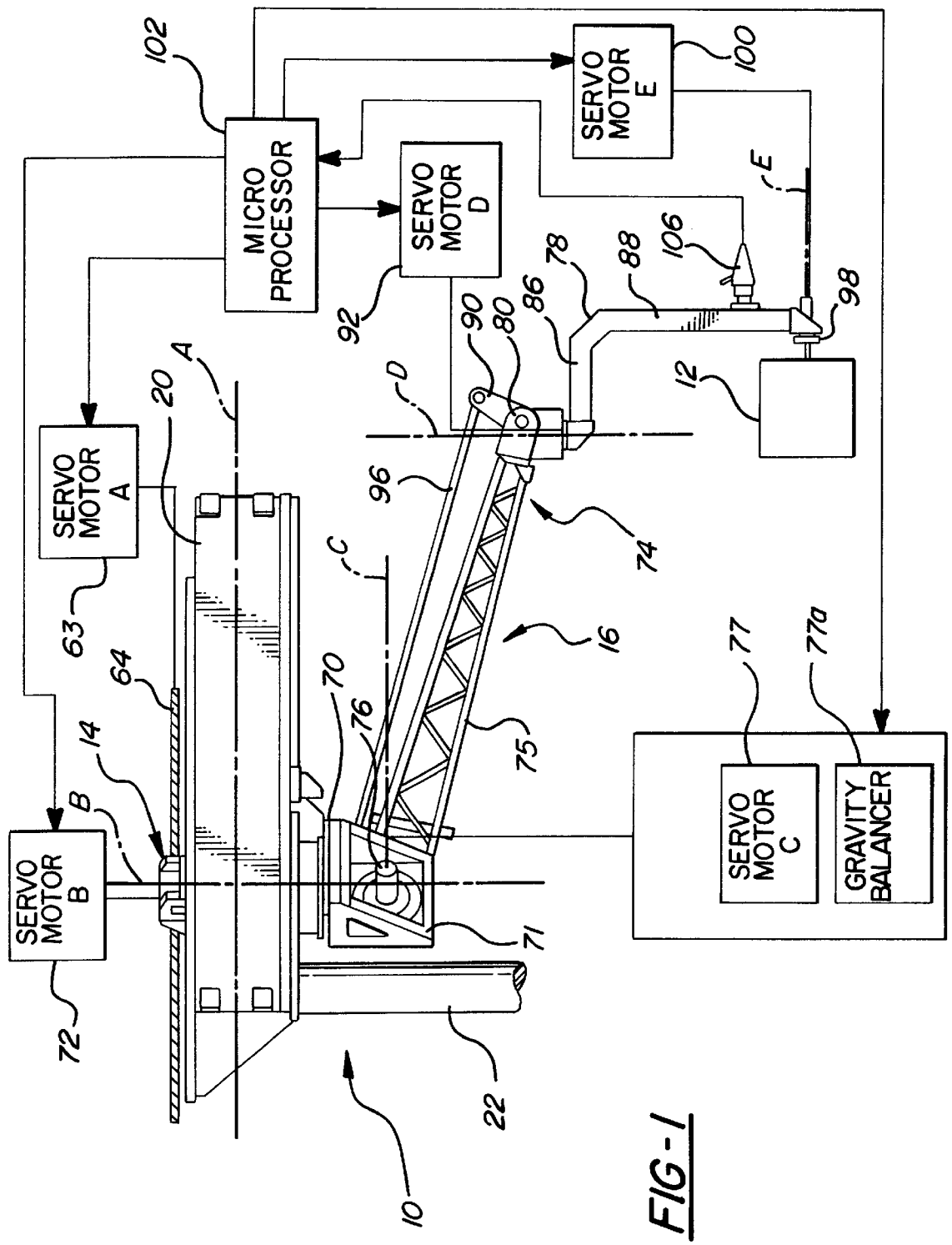
FIG. 1 is a perspective view of the intelligent power assisted manual manipulator.

Referring to the Figures, wherein like numerals indicate like or corresponding parts throughout the several views, an intelligent power assisted manual manipulator is generally shown at 10 in FIG. 1. The five axis manipulator 10 is depicted at a slight angle in FIG. 1. The manipulator 10 is controllable by operator inputs from an operator for moving an object 12 and is especially suited for lifting different objects having different weights, which will be discussed in greater detail below. The operator inputs are received by a controller, or microprocessor, and processed by the controller and software to effectuate a desired movement. The manipulator 10 may move an object 12 within a defined work area between two known points, a known and unknown point, and two unknown points. Known points are specific positions and orientations that may be specified independent of the operator's interaction with the manipulator, and unknown points are positions and orientations requiring operator interaction for precise placement of the object.

The manipulator 10 has a movable base, generally indicated at 14, supporting a lift mechanism, generally shown at 16, for moving the object 12. For overhead applications such as the one depicted in the Figures, the movable base 14 is preferably a carriage supported on an overhead rail 20. The overhead rail 20 is supported at either end by a pair of vertical support structures 22 (only one shown schematically in the Figure) anchored to a floor. The overhead rail 20 defines a generally horizontal first axis A along which the carriage 14 is movable.

Figure 2:
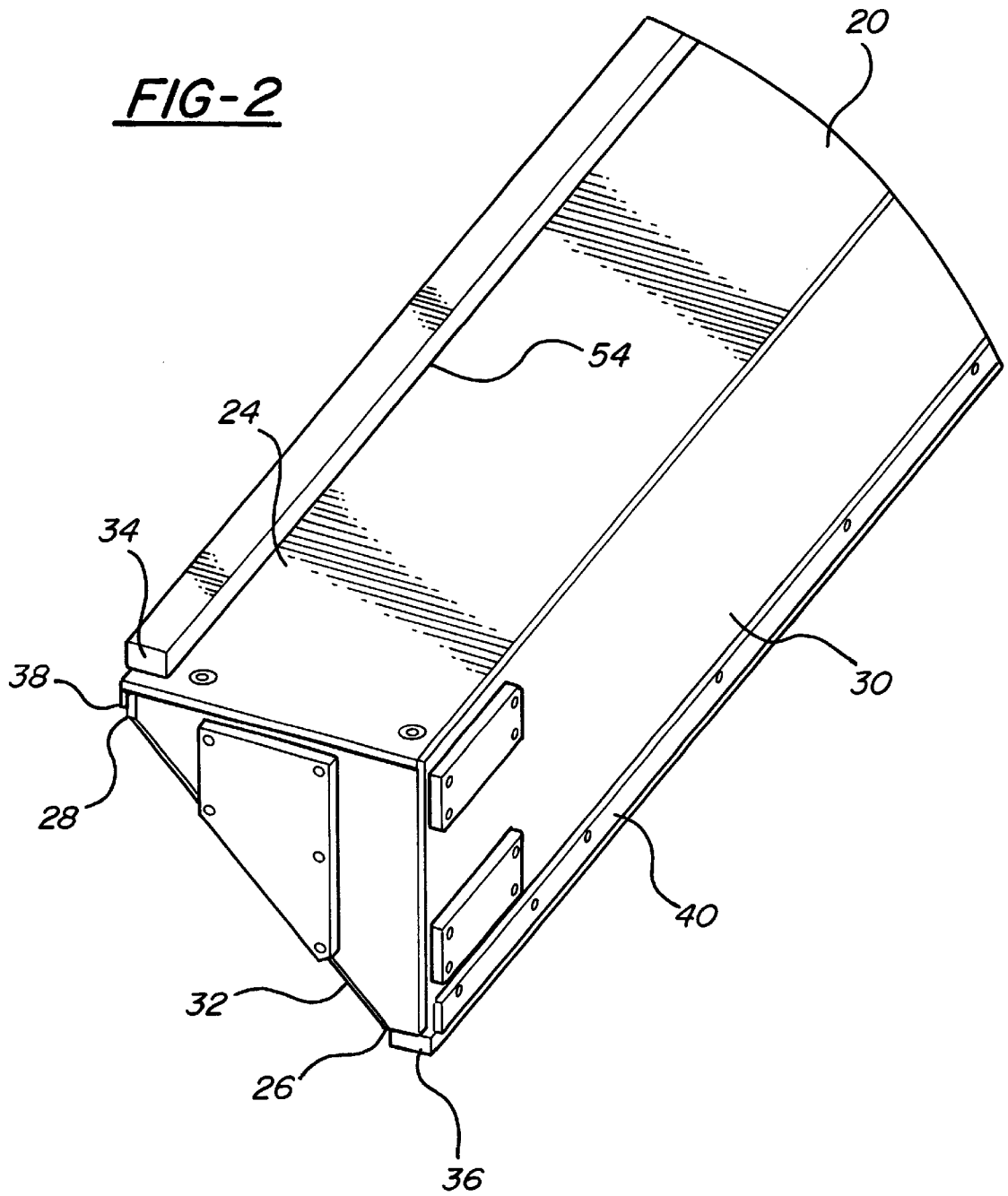
FIG. 2 is a perspective view of an overhead rail shown in FIG. 1.
Figure 3:
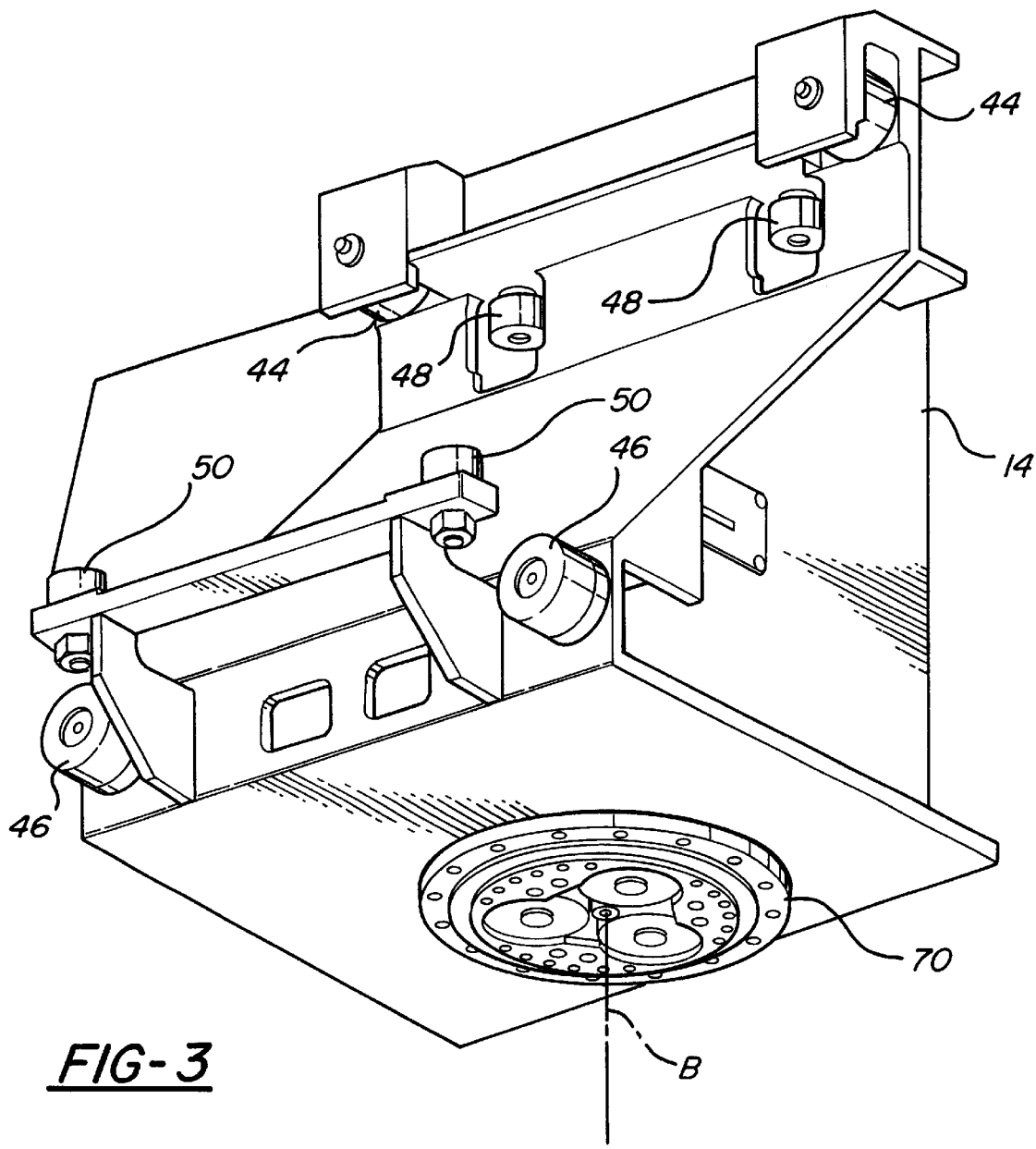
FIG. 3 is a perspective view of a carriage shown in FIG. 1.

Referring to FIGS. 2 and 3, the overhead rail 20 is constructed from a single elongated rail with at least one section. More than one section may be used to form the elongated rail 20 depending on the length of the overhead rail desired and other design considerations such as stiffness and the location and number of support members 22. The rail 20 has a generally triangular cross-section with first 24 and second 26 elongated portions in opposing generally horizontal planes formed from steel plates. The rail 20 also has third 28 and fourth 30 elongated portions in generally vertical planes formed from steel plates. A steel cross member 32 interconnects the second 26 and third 28 elongated member to provide a more rigid rail structure. First 34, second 36, third 38, and fourth 40 ways are disposed along the first 24, second 26, third 28, and fourth 30 elongated portions, respectively, for providing a bearing surface for the carriage 14. A single structural member may provide more than one elongated portion. For example, if a sufficiently thick metal member is used, a way may be disposed along two adjacent sides.

The carriage 14 has at least two first 44, second 46, third 48, and fourth 50 rollers supported on the carriage 14 for rolling engagement with the first 34, second 36, third 38, and fourth 40 ways, respectively. Multiple rollers are used to engage each of the ways 34, 36, 38, 40 to better ensure that proper alignment between the carriage 14 and rail 20 is maintained. The present invention utilizes unhardened ways and shims 54 between the ways 34, 36, 38, 40 and the elongated portions 24, 26, 28, 30 where necessary to achieve the proper alignment between the carriage 14 and rail 20. Because the ways 34, 36, 38, 40 are constructed from unhardened metal, oversized rollers 44, 46, 48, 50 are utilized to better distribute the weight of the carriage 14 and any supported portion of the manipulator 10 to avoid deforming the ways 34, 36, 38, 40 thereby introducing misalignment. More specifically, the oversized rollers provide adequate durability by distributing the load over a larger area. Smaller rollers would lead to fretting or brinelling failure of the ways due to the higher surface contact stress. By "oversized" rollers it is meant rollers having a larger diameter than would be required if hardened ways were utilized.

Referring now to FIG. 4, a cable drive assembly, generally shown at 58 has a drive pulley 60 supported on the overhead rail 20, or some other support structure, and an idler pulley 62 supported on the overhead rail 20, or some other support structure, opposite the drive pulley 60. A first servomotor 63 is supported on the overhead rail 20, or some other support structure, and is coupled to the drive pulley 60 for drivingly translating the carriage 14 along axis A by drivingly rotating the drive pulley 60, which is schematically shown in the Figure. Throughout this application "servomotors" is used to mean a position controlled electric motor, as opposed to a speed control electric motor. Accordingly, the position of the servomotor may be determined at any instant in time.

A cable 64 has one end 66 secured to the carriage 14 and the other end 66a secured to the drive pulley 60. The cable 64 has a portion wound only over one half of the idler pulley 62. A second cable 64a does not wind over the idler pulley 62, but has ends 66b and 66c that are secured the drive pulley 60 and the carriage 14, respectively. By using two cables 64 and 64a, slippage is prevented. The embodiment shown in FIG. 4 has the advantage of having the first servomotor 63 supported in a location other than the carriage 14 which increases the weight of the objects the manipulator 10 may handle.

Another embodiment of the cable drive assembly 58 is shown in FIG. 5. The cable drive assembly 58 has a drive pulley 60 supported on the carriage 14 and a cable 64 having opposing ends 66 and 66a secured to the overhead rail 20 and the drive pulley 60, respectively. A second cable 64a has ends 66b and 66c that are secured the drive pulley 60 and the opposite side of the overhead rail 20, respectively. By using two cables 64 and 64a, slippage is prevented. The first servomotor 63 is coupled to the drive pulley 60 for drivingly rotating the drive pulley 60 and moving the carriage 14 along the first axis A.

Figure 6:
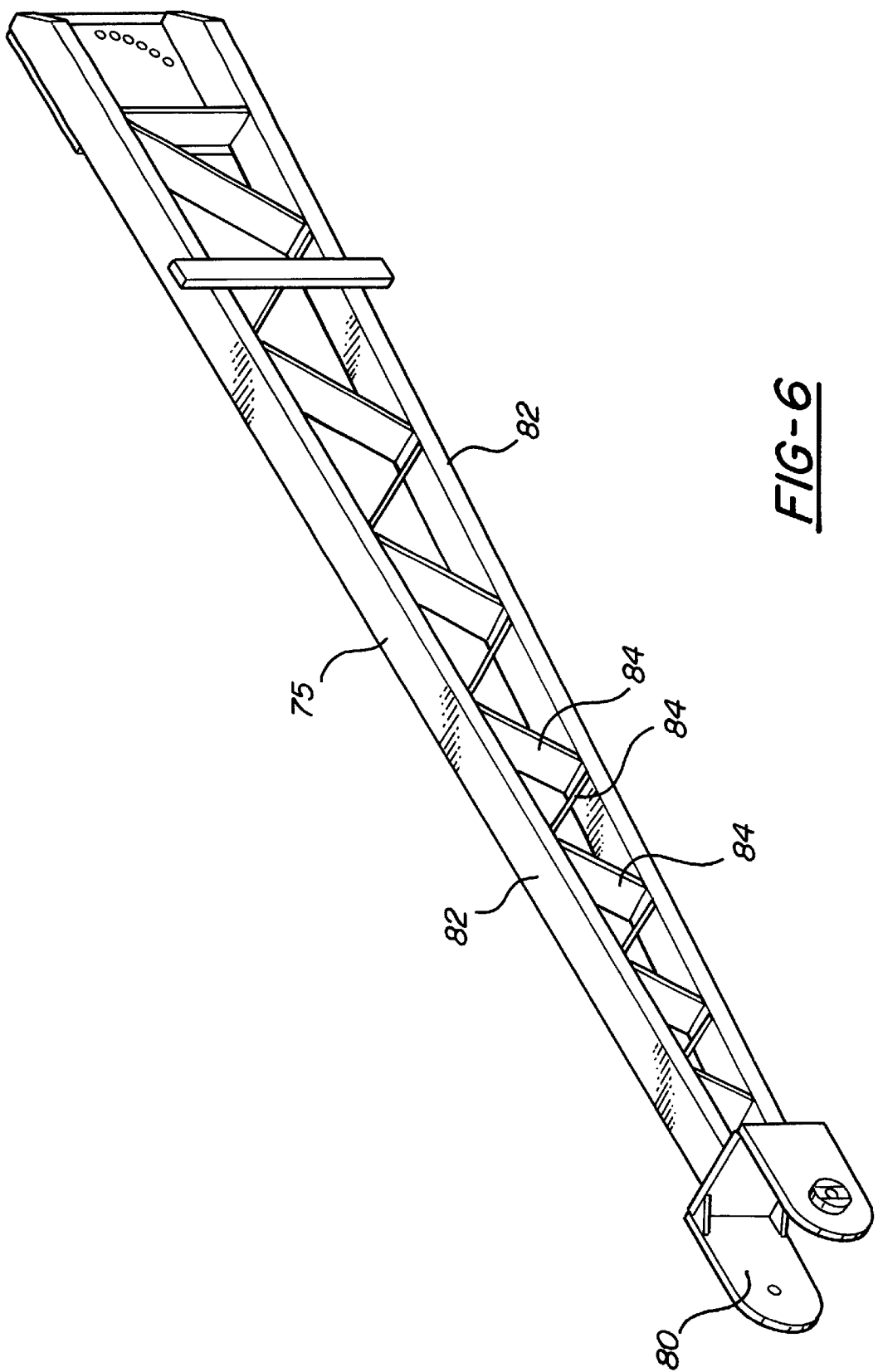
FIG. 6 is a perspective view of a main arm shown in FIG. 1.

Returning to FIGS. 1 and 2, the carriage 14 has a turret assembly 70 supported thereon defining a generally vertical rotational second axis B. The turret assembly 70 includes a cradle 71 that may be rotated relative to the carriage 14. A second servomotor 72 is supported on the carriage 14 and drivingly rotates the cradle 71 about second axis B. The lift mechanism 16 includes an arm assembly, generally shown at 74, that has a main arm 75 which is supported on the cradle 71 at a pivotal connection 76. The pivotal connection 76 defines a generally horizontal third axis C. A third servomotor 77 is supported on the cradle 71 for drivingly rotating the main arm 75 about the third axis C in a generally vertical plane. Referring to FIG. 6, the main arm 75 may be constructed from spaced apart tubular members 82 interconnected by a plurality of plates 84 arranged in a triangular pattern. The main arm 75 shown in the Figures provides a light weight, rigid structure with which to support objects 12. However, depending upon the application, additional structural support to the main arm 75 may be necessary to achieve the desired rigidity.

The third servomotor 77, or motion servomotor, may include a gravity balancer mechanism 77a to provide different functions resulting in more flexibility and increased safety. Specifically, a gravity balancer mechanism 77a may be used for supporting the different weights of different objects including the weight of the lift mechanism, and the third servomotor 77 may be used for producing a movement of the main arm 75 by drivingly rotating the main arm 75 about the third axis C. Said another way, the gravity balancer mechanism 77a provides the torque for lifting the weights of the object 12 and the lift mechanism while the third servomotor 77 provides fine control for moving the main arm 75 to the desired location. Accordingly, the gravity balancer mechanism 77a and third servomotor 77 produce maximum torques with the gravity balancer mechanism 77a maximum torque being greater than the third servomotor 77 maximum torque. For example, the gravity balancer mechanism 77a may require a torque capable of carrying in excess of 300 lbs. Preferably, the gravity balancer mechanism is an electric motor, but it may also be a pneumatic cylinder, spring, or any other suitable mechanism. To lift the object 12 and the weight of the suspended portion of the manipulator, however, the third servomotor 77 will need far less torque to effectuate the desired movement of the object.

The gravity balancer mechanism 77a may include a plurality of torque settings that produce a plurality of continuous torques which approximate the different weights of different objects. The settings may be hardware controlled by a mechanism such as a switch located on the manipulator. For example, if the operator typically moves two objects having two different weight, a switch having two positions may be provided. When the operator moves the first object, the switch should be set to the first position. Conversely, when the operator moves the second object, the switch should be set to the second position. Further, one setting may be for a zero payload in which only the weight of the arm is supported.

Control of the gravity balancer mechanism 77a and third servomotor 77 may be configured to better ensure safe operation of the manipulator 10 by acting as a check on one another. For example, if control is lost of the gravity balancer mechanism 77a due to unknown reasons, the third servomotor 77b will be unable to lift the object 12 on its own, which will cause a fault and disable the manipulator 10 or the third servomotor 77 will detect an undesired position of the gravity balancer mechanism 77a.

With continuing reference to FIG. 1, a secondary arm 78 is supported by a portion 80 of the main arm 75 opposite the pivotal connection 76. The secondary arm 78 is generally L-shaped with a generally horizontal short member 86 and a downwardly depending generally vertical long member 88. An elbow 90 is pivotally connected to the short member 86 of the secondary arm 78 at a generally fourth vertical axis D. The elbow 90 also connects the secondary arm 78 to the portion 80 of the main aim 75. A fourth servomotor 92 is supported on the elbow 90 and drivingly rotates the secondary arm 78 about axis D relative to the main arm 75. The configuration of the secondary arm 78 is intended to locate the object 12 generally in line with axis D to provide more intuitive positioning of the object 12 by the operator. Said another way, the object 12 is located in line with the axis D so that as the secondary arm 78 rotates about axis D the object 12 maintains its general position under the portion 80 of the main arm 75 and merely spins about axis D.

A linkage 96, generally parallel with the main arm 75, is pivotally attached to the elbow 90 and the cradle 71 for maintaining the secondary arm 78 in a generally vertical orientation. That is, as the main arm 75 is moved up and down by the third servomotor 77, the linkage 96 ensures that the object 12 maintains its angular position relative to horizontal.

An attachment interface 98 for carrying the object 12 is supported on the long member 88 of the secondary arm 78. Any type of tooling may be secured to the attachment interface depending upon the application. The attachment interface 98 is rotatable about an fifth axis E. A fifth servomotor 100 is supported on a lower portion of the secondary arm 78 for drivingly rotating the attachment interface 98 about axis E and rotating the object 12. The attachment interface may also include additional joints and motors to meet the specific requirements of a task.

The servomotors 63, 72, 77, 92, 100 are actuated by signals from a microprocessor 102 which receives operator inputs from an operator control mechanism 106 supported on the long member 88 of the lift mechanism 16. The microprocessor 102, which may be remotely located, receives the inputs and translates them into a position that it calculates as the operator's desired location for the object 12. Preferably, the operator control mechanism 106 is located as close to the object 12 as possible so that movement of the object 12 is more intuitive to the operator, that is, the operator feels as though he is lifting and moving the object 12 as if he were doing it manually without any power assist. For example, the operator control mechanism 106 may be supported proximate to the attachment interface 98, as shown in the Figures.

Figure 7:
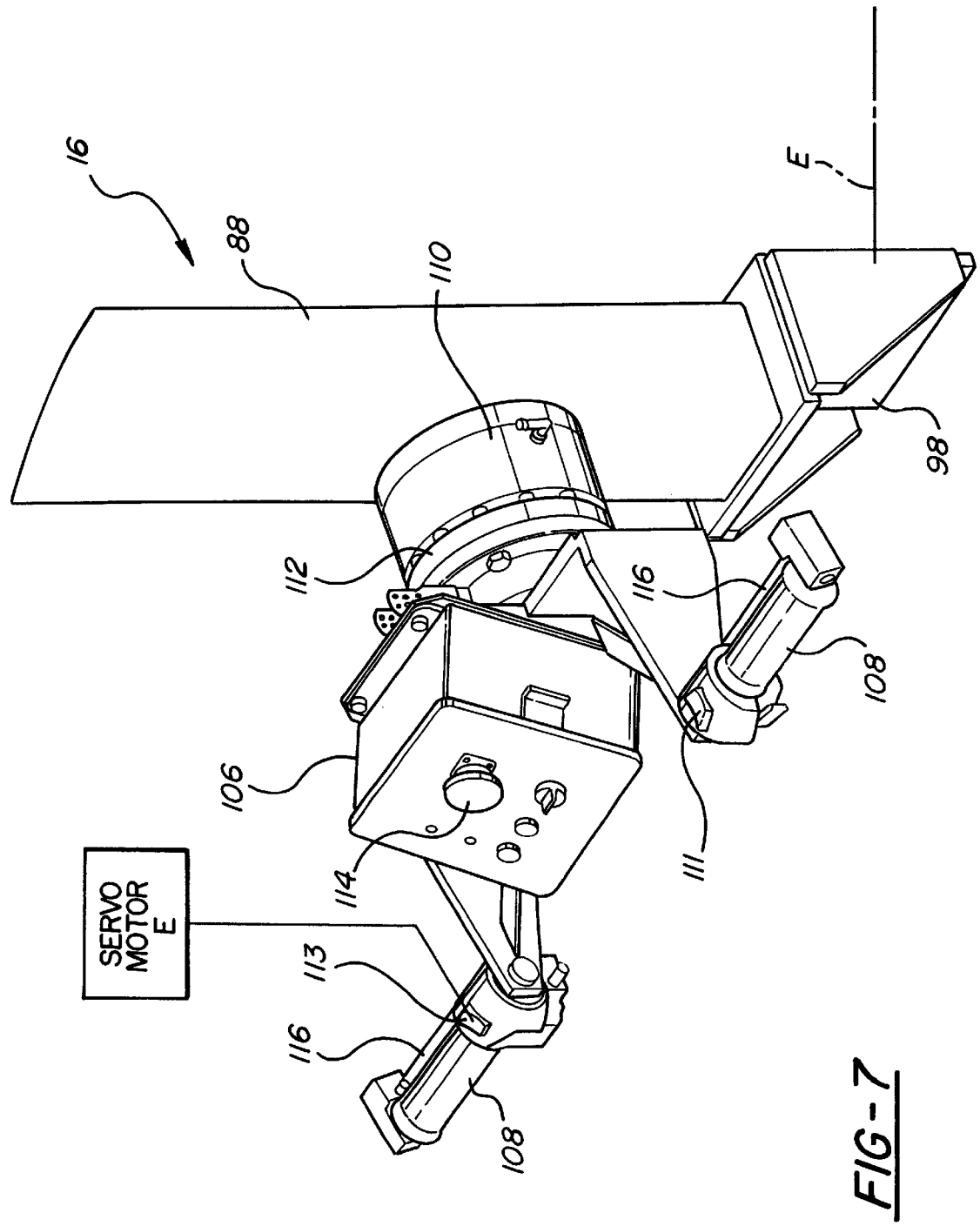
FIG. 7 is a perspective view of a operator control mechanism shown in FIG. 1.

Referring to FIG. 7, the operator control mechanism 106 has a pair of opposing handles 108 with which the operator may provide inputs in the form of forces and moments. A plurality of force sensors 110, which is interposed between the handles 108 and the secondary arm 78, senses the operator inputs and sends the signals to the microprocessor 102 where they are translated into servomotor commands for actuating the servomotors 63, 72, 77, 92, 100. Preferably, a multi-axis force sensor such as the FS30 force sensor manufactured by Fanuc Robotics is used to provide the plurality of force sensors. The multi-axis force sensor 110 is capable of detecting motion along six axes although fewer may be used, as is the case with the present invention. The operator control mechanism 106 has a switch 111 located on one of the handles 108 for actuating a clamping device (not shown) for clamping and unclamping the object 12 to ensure that the object 12 does not fall from the manipulator 10. The operator control mechanism 106 also has a switch 113 on one of the handles 108 for actuating the fifth servomotor 100 and rotating the object 12 about the fifth axis E.

A force sensor 112, or safety clutch, is interposed between the multi-axis force sensor 110 and the handles 108 to detect unsafe loads that might injure the operator or damage the manipulator 10, such as fifty pounds of force, and disable the manipulator 10. The safety clutch 112 may be constructed from opposing spring biased surface that kills the power to the manipulator 10 when they contact one another. For example, if the operator were to become pinned between the handles 108 and a wall, the manipulator 10 would become disabled once fifty pounds of force was reached. The operator control mechanism 106 incorporates other safety features to avoid operator injury. The operator control mechanism 106 has an emergency stop switch 114 located between the handles 108 so that the operator may disable the manipulator 10. Each of the handles 108 has a presence detector 116 adapted to detect the presence of the operator at the operator control mechanism 106, or more specifically, the detector 116 detects when both of operator's hands are on the handles 108. The manipulator 10 will only be enabled when the detector 116 detects the presence of the operator so that if the operator loses control the manipulator 10 becomes disabled to prevent the manipulator 10 or object 12 from striking and injuring the operator. Preferably, the detector 116 incorporates mechanical switches to detect the presence of the operator's hands although it may instead incorporate optical switches.

Figure 8:
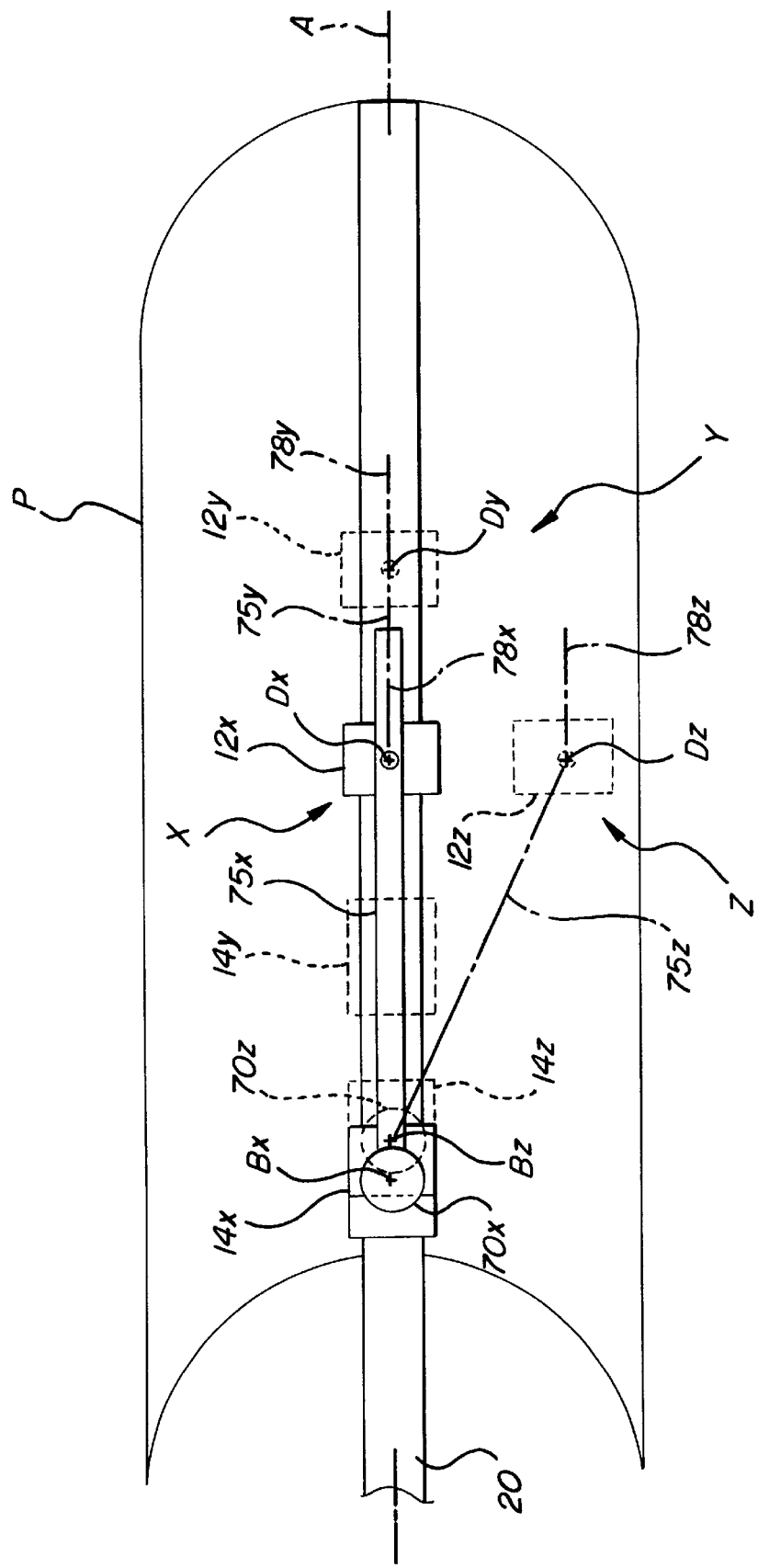
FIG. 8 is a schematic view of the manipulator moving an object to several positions.

In operation, to move an object 12 the operator grasps the handles 108 with both of his hands. The presence detector 116 detects the operator's hands and enables the manipulator 10 thereby making the servomotors 63, 72, 77, 92, 100 operational. The operator may begin to impart forces and moments on the handles 108 to move the object 12 to a desired location. Referring to FIG. 8, a work area P is shown. The manipulator 10 is shown schematically and the various elements include subscripts for clarity to indicate their associated position. Assuming the object 12 is located directly beneath the overhead rail 20 in position X, if the operator applies a force to the handles 108 directly in line with the overhead rail 20 to move to position Y the manipulator 10 will move the object 12 along axis of the rail 20. Specifically, the multi-axis force sensor 110 will sense the operator input and send a signal to the microprocessor 102. The microprocessor 102 will translate the signal and send a servomotor command to the first servomotor 63 which will drive the carriage 14 along the overhead rail 20.

With the object 12 again in position X, if the operator applies a force to the handles 108 perpendicular to the overhead rail 20, the manipulator 10 will move the object perpendicular to axis A to a position Z. The multi-axis force sensor 110 will sense the operator input and send the signal to the microprocessor 102. The microprocessor 102 will translate the signal and send servomotor commands to the first 63, second 72, and fourth 92 servomotors. When the microprocessor 102 receives a signal representing an operator input at an angle to the overhead rail 20, the microprocessor 102 will send signals to actuate both the second 72 and four 92 servomotors to move the object 12 to the position desired by the operator. Further, the first servomotor 63 will be actuated to maintain the object's axial position relative to axis A. So, as the operator applies a force to the handles 108 perpendicular to axis A, the secondary arm 78 will rotate relative to the main arm 75 about axis D and the main arm 75 will rotate relative to the cradle 71 about axis B to the positions shown. At the same time, the carriage 14 will move on the overhead rail 20 along axis A.

To move the object 12 up and down, the operator would apply force to the handles 108 in a vertical direction. The multi-axis force sensor 110 will sense the operator input and send a signal to the microprocessor 102. The microprocessor 102 will translate the signal and send a servomotor command to the gravity balancer mechanism 77a and third servomotor 77 to lift the object 12 to the desired position. The servomotors 77, 77a act in unison to lift the weight of the object 12 and move the object to the desired location, as discussed above.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An intelligent power assisted manual manipulator having at least five axes and being controllable by operator inputs from an operator for moving an object, said manipulator comprising:

a movable base comprising an overhead rail defining a generally horizontal first axis, and a carriage supported on said overhead rail and movable along said first axis;

a lift mechanism for moving the object, wherein said lift mechanism is supported by said movable base and comprises a turret assembly supported on said carriage and having a generally vertical second axis and a generally horizontal third axis, a main arm extending from said turret assembly and being rotatable about said second axis, and a secondary arm depending downwardly from said main arm and being rotatable about a generally vertical fourth axis, and wherein said secondary arm comprises an attachment interface that is adapted to support the object and has a fifth axis;

a linkage pivotally attached at one end to said turret assembly and operatively connected at another end to said secondary arm for maintaining said secondary arm in a generally vertical orientation;

at least one servomotor for drivingly translating said carriage along said first axis and for drivingly rotating said main arm about said second axis;

an operator control mechanism for receiving the operator inputs to control said manipulator about said first, second, third, fourth, and fifth axes, said operator control mechanism supported on said lift mechanism; and a plurality of force sensors disposed between said operator control mechanism and said lift mechanism, said force sensors sensing a force of the operator inputs and causing said at least one servomotor to actuate at least one of said movable base and said lift mechanism such that the object is moved.

2. The manipulator as set forth in claim 1 wherein said plurality of force sensors comprises a multi-axis force sensor.

3. The manipulator as set forth in claim 1 wherein said at least one servomotor comprises a first servomotor for drivingly translating said carriage along said first axis, and a second servomotor for drivingly rotating said main arm about said second axis.

4. The manipulator as set forth in claim 3 wherein said main arm is rotatable about said third axis, and said at least one servomotor comprises a third servomotor for drivingly rotating said main arm about said third axis.

5. The manipulator as set forth in claim 4 wherein said lift mechanism and the object each have a weight, and wherein said lift mechanism further comprises a gravity balancer mechanism for supporting said weight of said lift mechanism and the weight of the object.

6. The manipulator as set forth in claim 4 wherein said at least one servomotor comprises a fourth servomotor for drivingly rotating said secondary arm about said fourth axis.

7. The manipulator as set forth in claim 6 wherein said at least one servomotor comprises a fifth servomotor for drivingly rotating said attachment interface about said fifth axis.

8. The manipulator as set forth in claim 6 further comprising an elbow assembly pivotally attached to said main arm and supporting said secondary arm, and said linkage is generally parallel with said main arm and pivotally attached to said elbow and said turret assembly for maintaining said secondary arm in the generally vertical orientation.

9. The manipulator as set forth in claim 8 wherein said secondary arm is generally L-shaped with a generally horizontal short member and a downwardly depending generally vertical long member with said attachment interface supported on said long member.

10. The manipulator as set forth in claim 9 wherein said operator control mechanism is supported on said long member proximate to said attachment interface.

11. The manipulator as set forth in claim 10 further comprising a cable drive assembly having a drive pulley supported on said overhead rail and an idler pulley supported on said overhead rail opposite said drive pulley, and at least one cable secured to said carriage and said drive pulley, said first servomotor coupled to said drive pulley for drivingly rotating said drive pulley and moving said carriage along said first axis.

12. The manipulator as set forth in claim 3 further comprising a cable drive assembly having a drive pulley supported on said carnage and at least one cable secured to said overhead rail and said cable wound about said drive pulley, said first servomotor coupled to said drive pulley for drivingly rotating said drive pulley and moving said carriage along said first axis.

13. The manipulator as set forth in claim 2 wherein said operator control mechanism further includes at least one handle, and said multi-axis force sensor is interposed between said at least one handle and said secondary arm.

14. The manipulator as set forth in claim 13 wherein said at least one handle has a presence detector adapted to detect the presence of said operator at said operator control mechanism, said at least one servomotor actuatable when said operator is present at said operator control mechanism and disabled when said operator is absent from said operator control mechanism.

15. The manipulator as set forth in claim 1 further comprising a force sensor which disables said at least one servomotors when said operator input exceeds a predetermined load.

* * * * *